United States Patent
Bachman

(10) Patent No.: US 10,221,075 B1
(45) Date of Patent: Mar. 5, 2019

(54) SYNTHESIS OF AMMONIA FROM HYDROGEN SULFIDE

(71) Applicant: Benjamin Fannin Bachman, Madison, WI (US)

(72) Inventor: Benjamin Fannin Bachman, Madison, WI (US)

(*) Notice: Subject to any disclaimer, the term of this patent is extended or adjusted under 35 U.S.C. 154(b) by 0 days.

(21) Appl. No.: 15/880,517

(22) Filed: Jan. 25, 2018

(51) Int. Cl.
C01C 1/04 (2006.01)

(52) U.S. Cl.
CPC ..................... C01C 1/04 (2013.01)

(58) Field of Classification Search
USPC .......................................... 423/237
See application file for complete search history.

(56) References Cited

U.S. PATENT DOCUMENTS

| | | | | |
|---|---|---|---|---|
| 3,846,538 | A * | 11/1974 | Renault | C01B 17/167 423/183 |
| 4,547,293 | A * | 10/1985 | King | B01D 19/0005 210/638 |
| 6,117,407 | A * | 9/2000 | Cummins | C01C 1/04 423/352 |
| 2007/0183953 | A1* | 8/2007 | Kerley | B01D 53/48 423/244.07 |
| 2008/0161428 | A1* | 7/2008 | Strait | C01B 3/586 518/702 |
| 2008/0213157 | A1* | 9/2008 | McGrady | C01C 1/0405 423/353 |
| 2014/0197040 | A1* | 7/2014 | Gordon | C25C 1/02 205/702 |
| 2016/0251229 | A1* | 9/2016 | Alkusayer | C01B 3/025 564/65 |
| 2017/0037521 | A1* | 2/2017 | Licht | C01C 1/02 |
| 2017/0072338 | A1* | 3/2017 | Taylor | C01C 1/12 |
| 2017/0333832 | A1* | 11/2017 | Taylor | B01D 53/1468 |
| 2018/0016144 | A1* | 1/2018 | Yang | C01B 17/22 |

OTHER PUBLICATIONS

"Ammonia synthesis from N2 and H2O using a lithium cycling electrification strategy at atmospheric pressure" Joshua M. McEnaney, Aayush R. Singh, Jay A. Schwalbe, Jakob Kibsgaard, Energy Environ. Sci., 2017, 10, 1621.*

McEnaney, J; et al. Ammonia synthesis from N2 and H2O using a lithium cycling electrification strategy at atmospheric pressure; Energy Environ. Sci., 2017, 10, 1621-1630. DOI: 10.1039/c7ee01126a <http://pubs.rscorg/en/content/articlelanding/2017/ee/c7ee01126a#!divAbstract>.

NIST Chemistry WebBook, NIST Standard Reference Database No. 69, gas phase thermochemistry data, water, 2018, <http://webbook.nist.gov/cgi/cbook.cgi?ID=C7732185&Mask=1#Thermo-Gas>.

NIST Chemistry WebBook, Nist Standard Reference Database No. 69, gas phase thermochemistry data, Ammonia, 2018, <http://webbook.nist.gov/cgi/cbook.cgi?ID=C7664417&Mask=1#Thermo-Gas>.

Murakami, T.; et al. Electrochemical Synthesis of Ammonia and Coproduction of Metal Sulfides from Hydrogen Sulfide and Nitrogen under Atmospheric Pressure; J. Elec. Soc. 2005, 152, D109-D112. <http://jes.ecsdl.org/content/152/6/D109.full>.

NIST Chemistry WebBook, NIST Standard Reference Database No. 69, Condensed phase thermochemistry data, LiOH, 2018, <http://webbook.nist.gov/cgi/cbook.cgi?ID=C1310652&Mask=2#ref-1>.

NIST Chemistry WebBook, NIST Standard Reference Database No. 69, gas phase thermochemistry data, H2S, 2018, <http://webbook.nist.gov/cgi/cbook.cgi?ID=C7783064&Mask=8#Thermo-React>.

O'Hare, P.A.G; Johnson, G.; Lithium nitride (Li3N): standard enthalpy of formation by solution calorimetry; J Chem. Thermo 1975, 7, 13-20. <https://www.sciencedirect.com/science/article/pii/0021961475900750>.

Kimura, H; et al. Vaporization of lithium sulfide; Journal of Nuclear Materials, 1981, 97, 3, 259-264. <http://www.sciencedirect.com/science/article/pii/0022311581904736>.

NIST Chemistry WebBook, NIST Standard Reference Database No. 69, Condensed phase thermochemistry data, Lithium, 2018, < http://webbook.nist.gov/cgi/cbook.cgi?ID=C7439932&Units=Si&Mask=2#Thermo-Condensed>.

NIST Chemistry WebBook, NIST Standard Reference Database No. 69, gas phase thermochemistry data, Nitrogen, 2018, <http://webbook.nist.gov/cgi/cbook.cgi?ID=C7727379&Mask=1#Thermo-Gas>.

NIST Chemistry WebBook, NIST Standard Reference Database No. 69, Condensed phase thermochemistry data, Sulfur, 2018, <http://webbook.nist.gov/cgi/inchi?ID=C7704349&Mask=1#Thermo-Gas>.

Li, X; et al.; Facile Synthesis of Lithium Sulfide Nanocrystals for Use in Advanced Rechargeable Batteries; ACS applied materials and interfaces; 2015, 7 (51) 28444-28451. <http://pubs.acs.org/doi/pdf/10.1021/acsami.5b09367>.

* cited by examiner

*Primary Examiner* — Kevin R Kruer

(57) ABSTRACT

A novel chemical cycle for producing and capturing ammonia using nitrogen and hydrogen sulfide containing feedstocks is presented. An example of this cycle may start with the reaction between lithium nitride and hydrogen sulfide containing materials to form both lithium sulfide containing material and ammonia, where the produced ammonia is separated and captured. Metallic lithium may then be extracted high temperatures from said lithium sulfide containing material and then may or may not be separated from the said lithium sulfide containing material and other byproducts. The said extracted metallic lithium containing material may then be reacted with nitrogen containing feedstock to form lithium nitride containing material to complete the cycle.

3 Claims, No Drawings

SYNTHESIS OF AMMONIA FROM HYDROGEN SULFIDE

BACKGROUND OF THE INVENTION

Field of the Invention

The invention discloses a novel method to produce ammonia using lithium-containing materials as intermediates in a cycle which uses hydrogen sulfide and nitrogen containing materials as feedstocks. This invention falls primarily into class 422/148 of ammonia synthesizer patents.

Prior Art

Worldwide production of ammonia to date has been dominated by the Haber-Bosch process, which currently produces most of the ammonia ($NH_3$) used on Earth. The intrinsic inefficiencies and dependence on fossil fuels of the Haber-Bosch process necessitates a more environmentally benign approach to ammonia synthesis. This is especially true because of the basic importance of ammonia as one of the main ingredients to most fertilizers used around the world. The reaction of lithium (Li) with nitrogen ($N_2$) to form lithium nitride ($Li_3N$) has been proposed as a potential alternative route to fixate $N_2$ without the need of a high-pressure system or methane gas, which is used by the Haber-Bosch process. (see Prior Art Reference Document 1) McEnaney and colleagues demonstrated that this route to nitrogen fixation could produce ammonia through the reaction of $Li_3N$ with water to form lithium hydroxide (LiOH) and $NH_3$. (see Prior Art Reference Document 1) In this publication it was shown that the Li could then be recycled from LiOH via high temperature electrolysis to form water, oxygen, and metallic Li. (see Prior Art Reference Document 1) This Li is then recycled back into the system to fixate more $N_2$, competing a cycle which could operate under one atmosphere of pressure and does not require fossil fuels. (see Prior Art Reference Document 1) The authors of this publication claim that this cycle requires approximately 14 kW h per kg $NH_3$ produced, and has a current efficiency of 88.5%. (see Prior Art Reference Document 1) This is near the average energy required for factories running the Haber-Bosch process at approximately 10 kW h per kg $NH_3$, and it is more efficient than when coal-powered factories are used to produce ammonia at 15 kW h per kg $NH_3$. (see Prior Art Reference Document 1) While this cycle is promising, it has downsides. While Li is completely recovered in this process, the sheer volume needed would provide a practical cost-barrier to implementing this method of ammonia production.

Beyond the cycle proposed by McEnaney et al., a second alternative method of ammonia production is molten-salt electrolysis of $N_2$ and $H_2S$. (see Prior Art Reference Document 4) This method, demonstrated by Murakami et al. bubbles hydrogen sulfide ($H_2S$) through a eutectic mixture of LiCl—KCl—CsCl—$Li_3N$ while applying a large bias between nickel (Ni) and $N_2$ electrodes. (see Prior Art Reference Document 4) At high enough potentials (~2 V), $N_2$ is reduced to $NH_3$ through a two-step reaction pathway, the first being the reduction of $N_2$ to the nitride ion ($N^{3-}$), and the second is the reaction between $N^{3-}$ and $H_2S$ gas to form $NH_3$ and $S_2^-$ in solution.[4] This second reaction between the $H_2S$ and $N^{3-}$ is very favorable with a calculated equilibrium constant of $6.9 \times 10^{40}$; the authors found that this reaction went 100% to completion. (see Prior Art Reference Document 4) However, the authors of this publication note that this current density is not high enough for practical use to produce ammonia. (see Prior Art Reference Document 4)

REFERENCES CITED

Prior Art Reference Document 1'
McEnaney, J; et al. Ammonia synthesis from N2 and H2O using a lithium cycling electrification strategy at atmospheric pressure; *Energy Environ. Sci.*, 2017, 10, 1621-1630. DOI: 10.1039/c7ee01126a <http://pubs.rsc.org/en/content/articlelanding/2017/ee/c7ee01126a#!divAbstract>

Prior Art Reference Document 2—
NIST Chemistry WebBook, NIST Standard Reference Database Number 69, gas phase thermochemistry data, water, 2018, <http://webbook.nist.gov/cgi/ebook.cgi?ID=C7732185&Mask=1#Thermo-Gas>

Prior Art Reference Document 3—
NIST Chemistry WebBook, NIST Standard Reference Database Number 69, gas phase thermochemistry data, Ammonia, 2018, <http://webbook.nist.gov/cgi/ebook.cgi?ID=C7664417&Mask=1#Thermo-Gas>

Prior Art Reference Document 4—
Murakami, T.; et al. Electrochemical Synthesis of Ammonia and Coproduction of Metal Sulfides from Hydrogen Sulfide and Nitrogen under Atmospheric Pressure; *J. Elec. Soc.* 2005, 152, D109-D112. <http://jes.ecsdl.org/content/152/6/D109.full>

Prior Art Reference Document 5—
NIST Chemistry WebBook, NIST Standard Reference Database Number 69, Condensed phase thermochemistry data, LiOH, 2018, <http://webbook.nist.gov/cgi/ebook.cgi?ID=C1310652&Mask=2#ref-1>

Prior Art Reference Document 6—
NIST Chemistry WebBook, NIST Standard Reference Database Number 69, gas phase thermochemistry data, $H_2S$, 2018, <http://webbook.nist.gov/cgi/ebook.cgi?ID=C7783064&Mask=8#Thermo-React>

Prior Art Reference Document 7—
O'Hare, P. A. G; Johnson, G.; Lithium nitride (Li3N): standard enthalpy of formation by solution calorimetry; *J. Chem. Thermo.* 1975, 7, 13-20. <http://www.sciencedirect.com/science/article/pii/0021961475900750>

Prior Art Reference Document 8—
Kimura, H; et al. Vaporization of lithium sulfide; *Journal of Nuclear Materials*, 1981, 97, 3, 259-264. <http://www-.sciencedirect.com/science/article/pii/0022311581904736>

Prior Art Reference Document 9—
NIST Chemistry WebBook, NIST Standard Reference Database Number 69, Condensed phase thermochemistry data, Lithium, 2018, <http://webbook.nist.gov/cgi/ebook.cgi?ID=C7439932&Units=SI&Mask=2#Thermo-Condensed>

Prior Art Reference Document 10—
NIST Chemistry WebBook, NIST Standard Reference Database Number 69, gas phase thermochemistry data, Nitrogen, 2018, <http://webbook.nist.gov/cgi/ebook.cgi?ID=7727379&Mask=1#Thermo-Gas>

Prior Art Reference Document 11—
NIST Chemistry WebBook, NIST Standard Reference Database Number 69, Condensed phase thermochemistry data, Sulfur, 2018, <http://webbook.nist.gov/cgi/inchi?ID=C7704349&Mask=1#Thermo-Gas>

Prior Art Reference Document 12—
Li, X; et al.; Facile Synthesis of Lithium Sulfide Nanocrystals for Use in Advanced Rechargeable Batteries; *ACS applied materials and interfaces;* 2015, 7 (51) 28444-28451. <http://pubs.acs.org/doi/pdf/10.1021/acsami.5b09367>

BRIEF SUMMARY OF THE INVENTION

The objective of this invention is to produce ammonia more efficiently than currently used methods. This invention can produce a mole of ammonia with less energy than a similar cycle which uses water instead of hydrogen sulfide, it does not require the use of fossil fuels, and calculations suggests that it is more energy efficient than the Haber-Bosch process. (see Prior Art Reference Documents 2-11) It can also convert an environmental pollutant and industrial waste product ($H_2S$) into ammonia, an essential commodity.

This invention is a novel chemical cycle for producing and capturing ammonia using nitrogen and hydrogen sulfide containing feedstocks. An example of this cycle may start (but can start at any step of the cycle) with the reaction between lithium nitride and hydrogen sulfide containing materials to form both lithium sulfide containing material and ammonia, where the ammonia is separated and captured. Metallic lithium is extracted at high temperatures from the said lithium sulfide containing material and may or may not be separated from sulfur, byproducts, and or impurities. The lithium is then reacted with nitrogen containing feedstock to form lithium nitride containing material to complete the cycle.

DETAILED DESCRIPTION OF THE INVENTION

This invention is a novel chemical cycle for producing and capturing ammonia using nitrogen and hydrogen sulfide containing feedstocks. This chemical cycle may be run as follows: a gas or liquid composed mainly or completely of hydrogen sulfide that contains little to no oxygen or water may be introduce to a vessel, capable of withstanding high temperatures, which contains solid or liquid lithium nitride containing material. To achieve liquid lithium nitride the vessel must be heated to well over 900 degrees C. (see Prior Art Reference Document 7) These compounds will react in the vessel to form both gaseous ammonia and solid or liquid lithium sulfide depending on the temperature. If the publication by Murakami et al. is correct, this reaction will release heat and have an equilibrium constant of about $6.9 \times 10^{40}$, meaning in part, that this reaction may be violent if not properly contained. (see Prior Art Reference Document 4) If the lithium nitride is heated above the melting point of lithium sulfide, then the surface of the lithium nitride will melt as it reacts with hydrogen sulfide to form lithium sulfide. (see Prior Art Reference Document 12) This melting will increase reaction rates substantially but is not required to run the reaction. The said gaseous ammonia generated from the reaction between hydrogen sulfide containing feedstocks and lithium nitride containing material may then be vented from the vessel, captured, and may be purified of unreacted hydrogen sulfide and other impurities and or biproducts if necessary. The ammonia may be captured through displacement by an inert gas, through the liquification of the ammonia, through compressing the vessel it was formed in to lower the volume and remove ammonia, or through the use of a vacuum pump to pull the ammonia from the vessel where it was formed, or a combination of any of the processes listed or not listed here for gas extraction and capture could be used. If necessary, any residual hydrogen sulfide may be separated from the ammonia gas by pressure swing adsorption or any related techniques for gas purification. The lithium sulfide containing material remaining in the vessel after the ammonia is removed may be heated above 600 degrees Celsius and may or may not be pressured to extract the lithium using either thermal decomposition or electrolysis. If thermal decomposition is used, the lithium sulfide containing material may be heated in a vessel under either low, ambient, or high pressures, until the lithium sulfide decomposes into its constituent elements to form solid or liquid lithium and liquid or gaseous sulfur, which can then be separated through condensation, filtration, or distillation. The if low pressures are used, the lithium and sulfur decomposition products may be separated through sublimation. If electrolysis is used, the lithium sulfide containing material may be heated to a melt or near melt while two electrodes apply a potential through the solution, plating lithium to one electrode and generating gaseous or liquid sulfur at the other, the speed at which this happens will be determined by the current that the electrodes pass. The electrolysis may be done by applying a constant current through the liquid or nearly-liquid lithium sulfide. This electrolysis process may use a membrane to separate the two half-reactions; or use the different melting and boiling points of lithium and sulfur to separate them. The electrolysis method may also separate the lithium and sulfur formed on the electrodes through condensation, filtration, distillation, or sublimation. The said lithium may then either stay in the same vessel or be moved to a new vessel where it may be exposed to a gas or liquid that contains nitrogen but little to no oxygen or water to form lithium nitride. The lithium may or may not be ground into smaller pieces or powder during or before that step in the cycle. A potential may or may not be applied between the lithium and the liquid or gas that contains nitrogen but little to no oxygen or water during this step in the cycle. The vessel with metallic lithium may also be heated to increase reaction speed or to boil a liquid that contains nitrogen but little to no oxygen or water. The vessel may also be pressurized with nitrogen or inert gas to increase reaction speed between lithium and nitrogen. The said lithium nitride produced through this process may either stay in the same vessel or be transferred to a new vessel to restart the cycle by the introduction of a gas or liquid composed mainly or completely of hydrogen sulfide that contains little to no oxygen or water. This cycle may be run entirely within a single reaction vessel or in multiple vessels.

The herein presented invention seeks to improve upon the three aforementioned methods of producing ammonia in the prior art section. This invention improves upon the Haber-Bosch process because it does not require the use of fossil fuels to produce ammonia. While it does utilize $H_2S$, a compound produced primarily as an industrial byproduct of oil refining, $H_2S$ can be produced and harvested from biological sources such as swamps and landfills. This invention improves upon the process proposed by McEnaney and colleagues in two ways: first, by using H2S instead of water, the product of the reaction with $Li_3N$ is $Li_2S$ instead of LiOH. (see Prior Art Reference Documents 5 and 8) While $Li_2S$ has a higher melting point than LiOH, $Li_2S$ has a smaller enthalpy of formation, which allows it to be split into its constituent element with less energy. (see Prior Art Reference Documents 5 and 8) Further, when $Li_2S$ is produced it has up to twice as much lithium as LiOH because $Li_2S$ has twice the stoichiometric amount of lithium per atom. This has the consequence that the stoichiometric coefficients in the balance chemical reaction of the herein described invention are three molecules of $H_2S$ for every 2 molecules of $NH_3$ produced, which significantly decreases the energy input required to run this cycle. This leads to the calculated free energy required to run this herein described ammonia production cycle to be less energy to run than the calculated Gibbs free energy required per cycle of the process proposed by McEnaney and colleagues. (see Prior Art Reference Documents 2, 3 and 6) This calculation was done using values from the NIST website on hydrogen sulfide (−20.6 kJ per mol and 205.81 J per mol K). (see Prior Art Reference Document 6) This significant improvement to the calculated energy required to produce one mole of ammonia with respect to the cycle shown by McEnaney and colleagues, strongly implies that this invention is more efficient than the Haber-Bosch process because the process proposed by McEnaney and colleagues is nearly as energy efficient already. Finally, this invention improves upon the ammonia production process by Murakami et al. because it can produce ammonia at much higher rates. (see Prior Art Reference Document 4) This invention is the first process that utilizes the reaction of hydrogen sulfide and lithium nitride to produce ammonia in a cycle, and the first process that regenerates lithium nitride using lithium recovered from lithium sulfide and nitrogen containing liquid or gas.

What is claimed:

1. A process compromising the following steps in one or more reaction vessels:
   a reaction between lithium nitride containing material and hydrogen sulfide containing feedstock to form lithium sulfide containing material and ammonia;
   the separation and capture of said lithium sulfide containing material and said ammonia;
   the extraction of lithium from the said lithium sulfide containing material;
   and the reaction of said extracted lithium with nitrogen containing feedstock to form lithium nitride containing material.

2. The process of claim 1, wherein said metallic lithium is extracted from said lithium sulfide containing material in a vessel above 600 degrees Celsius using thermal decomposition, electrolysis, sublimation, or any combination thereof.

3. The process of claim 1, wherein said lithium nitride is produced by heating said extracted lithium while exposed to said nitrogen containing feedstock.

\* \* \* \* \*